United States Patent [19]
Grannen et al.

[11] 3,816,356
[45] June 11, 1974

[54] MELAMINE BASE POLYMERIC SEQUESTERING AGENT AND PROCESS

[75] Inventors: Edward Grannen, Upland; Leon Robinson, Diamond Bar, both of Calif.

[73] Assignee: Occidental Petrolium Corp., Los Angeles, Calif.

[22] Filed: Oct. 26, 1971

[21] Appl. No.: 192,570

[52] U.S. Cl.............. 260/2.2 C, 210/38, 260/51.5, 260/67.6 R
[51] Int. Cl............................................. C08g 9/30
[58] Field of Search............ 260/2.2 C, 67.6 R, 51.5

[56] References Cited
UNITED STATES PATENTS
2,575,518  11/1951  Holmes et al........................ 210/24
3,481,903  12/1969  D'Alelio............................ 260/67.6

FOREIGN PATENTS OR APPLICATIONS
14,790  5/1958  East Germany

OTHER PUBLICATIONS
Manecke, Makromol. Chem. 121, 129–46(1969).

*Primary Examiner*—Melvin Goldstein
*Attorney, Agent, or Firm*—Christie, Parker & Hale

[57] ABSTRACT

Water-insoluble, cross-linked sequestering resins formed by reaction with chloroacetic acid and cross-linking of melamine. The active sequestering group on the resin is -NCH$_2$COOH or salt thereof. A process for removing polyvalent ions from water with such a resin is provided.

8 Claims, No Drawings

MELAMINE BASE POLYMERIC SEQUESTERING AGENT AND PROCESS

BACKGROUND

Ion exchange or sequestering agents in the form of water insoluble resins are known and commercially available for a variety of uses. Many commercial operations require aqueous solutions substantially free of polyvalent cations and these can be removed with suitable sequestering agents. When large scale processes are involved it is important that the sequestering resins have substantial water-insolubility to avoid loss of resin and also have a relatively high proportion of sequestering groups so that the quantity of water that can be treated is relatively large before recharging is required. It is also desirable that the sequestering agent remove substantially all of the polyvalent ions from relatively dilute solutions thereof. In other cases it is desirable to remove polyvalent ions from solution in order to recover the value thereof, and this can also be accomplished with suitable sequestering agents.

It is known from U.S. Pat. Nos. 3,310,530 and 3,352,801 that amino carboxylic acids can be effective sequestering groups. Some of these resins have aromatic and aliphatic chains and have been cross-linked to form network polymers with reasonable water insolubility. According to these patents the number of sequestering groups in the polymer is one for about every four nitrogens in the polymer chain. A higher proportion of sequestering groups is desirable for reducing the quantity of resin required for large scale treatment.

BRIEF SUMMARY OF THE INVENTION

There is provided in practice of this invention according to a presently preferred embodiment a water insoluble cross-linked sequestering resin comprising repeating units of

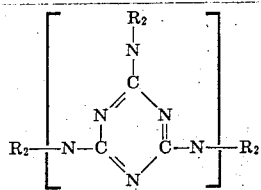

wherein R is selected from the group consisting of —H, —CH$_2$COOX, —CH$_2$OX,

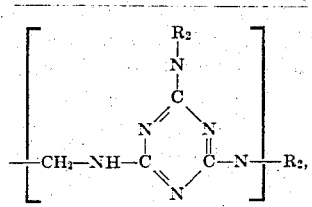

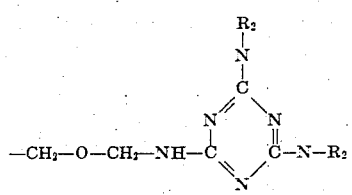

and

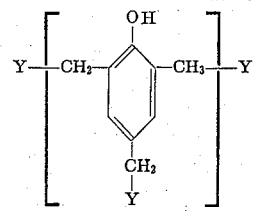

where X is selected from the group consisting of H, Na, Li, K, and NH$_4$, Y is the repeating unit or R, and wherein at least about one-sixth of R comprise —CH$_2$COOX.

DESCRIPTION

These and other features and advantages of this invention are achieved by synthesizing the resin from melamine by reaction with chloroacetic acid followed by polymerization with formaldehyde. An apparently crystalline, water-insoluble, resin with good sequestering ability is formed. The number of effective sequestering groups exceeds one for every three amine nitrogens in the polymer.

Sequestering resins are prepared by first reacting melamine in strongly basic solution with chloroacetic acid. This reaction proceeds rapidly at room temperature and is preferably maintained below about 35° C to inhibit unwanted reactions. Some warming may be desirable to enhance the rate of solution of the melamine. A solution having about ten percent by weight of sodium hydroxide forms the basic reaction medium. From 5 to 10 percent by weight of chloroacetic acid is included in the solution. Melamine is added and the solution stirred for at least ten minutes after the melamine is dissolved, which is believed to be necessary to reach equilibrium. Warming of the solution to not more than 35° C enhances equilibration. A number of carboxylic acid intermediates having different degrees of substitution may be obtained such as, for example,

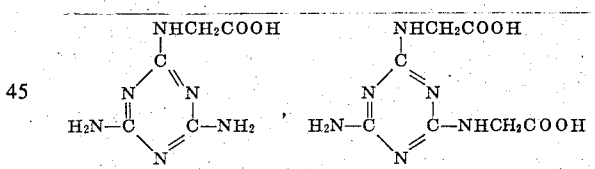

and the like. In addition substitution may occur for both hydrogens on the amine nitrogens in a few instances.

Typically the proportion of chloroacetic acid to melamine is in proportion of one mole to one mole so that on the average there is at least one sequestering group substituted on each melamine ring. When two moles of chloroacetic acid are used for each mole of melamine, additional substitutions occur so that on the average each melamine ring has as many as two carboxylic acid groups attached. The effective sequestering ability is apparently not increased proportionately, however, since the amine nitrogen is included in the sequestering action and bisubstitution on an amine nitrogen may not enhance the sequestering ability. The degree of substitution of carboxylic acid groups should also be limited to permit sufficient cross-linking during subsequent polymerization to form a rigid non-gummy polymer.

If desired in order to extend the polymer and assure adequate cross-linking phenol or derivatives thereof may be included in the polymer after reaction with chloroacetic acid in addition to the melamine.

After reaction with chloroacetic acid the solution is mixed with additional sodium hydroxide solution containing formaldehyde in a proportion wherein there is from about 2.5 to 3.5 moles of formaldehyde per mole of original melamine. If desired, phenol may be included in the composition in a proportion up to about 1 mole per mole of melamine. Higher proportions of phenol can be used; however, there is no gain in desirable properties and the sequestering ability may be proportionately decreased. The added phenol can be added substantially with the formaldehyde solution, or if desired a prepolymer such as 2,6-dimethylol-4-methyl phenol or 2,4,6-trimethylol phenol can be separately prepared and added with or after the formaldehyde solution. The pH of the solution should be maintained in the range from 10 to 11 and the temperature is at or somewhat above room temperature without any ascertained criticality. A series of prepolymers of the melamine reacted with chloroacetic acid are formed including as only a few examples,

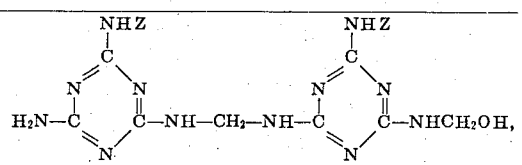

and

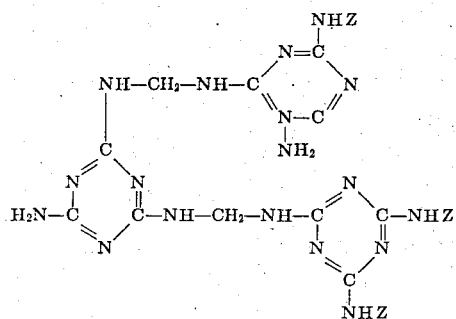

wherein Z is the $CH_2COONa$ group.

The temperature of the solution is then raised to boiling under reflux conditions either at atmospheric pressure or slightly enhanced pressure as may be desired. This heating continues the polymerization reaction to form a network polymer that is highly cross-linked and substantially completely water insoluble. Although some ring closure may occur in the polymerization reactions the principal bonding is believed to be by methylene linkages; further, ether linkages are also believed present to a limited degree. A granular crystalline polymer occurs that is readily filtered from the solution. The polymer may be formed as carboxylic acid or as a mono-valent salt thereof, such as the sodium potassium, lithium, or ammonium salt. In use, of course, the sequestering of polyvalent ions occurs at the site of the salt.

Thus after cross-linking the sequestering resin has repeating units of

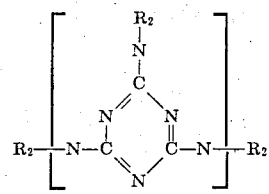

wherein R is selected from the group consisting of —H, —$CH_2COOX$ and —$CH_2OX$ wherein X is H, Na, K, Li, or $NH_4$. In addition to these chain stopping groups a polymer may include additional chain elements selected from

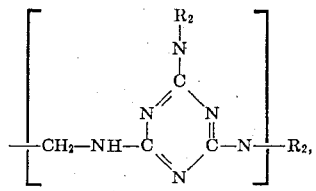

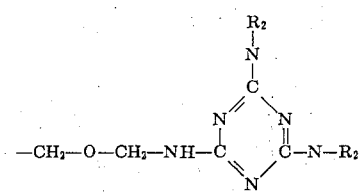

and also

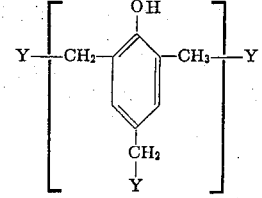

when phenolic elements are included in the composition, where Y is the repeating unit, R or one of the same units of this group. It will also be apparent that complex cross-linkages may occur in the polymerization reaction so that this latter group is not necessarily exhaustive of the possibilities.

EXAMPLES

Example 1

One-half mole or 47.2 grams of chloroacetic acid was dissolved in one-half liter of ten percent sodium hydroxide solution. The solution was kept below about 35° C while 63 grams of melamine was added. The solution was stirred for 30 minutes at 35° C. About one-half liter 10 percent sodium hydroxide solution containing 90 grams of formaldehyde was slowly added while stirring. The resultant solution was maintained at a pH in the range of from 10 to 11 and heating at 35° C was continued for an additional 10 minutes.

Thereafter the temperature was increased to boiling with a reflux condenser over the flask. After boiling for 60 minutes, the granular, apparently crystalline, product was filtered and washed with 0.1 N sodium hydroxide solution and with distilled water. The polymer was dried at about 110° C. A yield of better than 90 percent, based on the melamine, was obtained. About 1.4 milli-equivalents of ferric ion is sequestered per gram of polymer. A portion of the polymer was exposed to an excess of cupric ion which turned it blue, and it was thereafter washed with water and soaked in distilled water. No significant leaching of cupric ion back into the distilled water was noted.

Example 2

A sequestering resin was made by the same technique set forth in Example 1, except that 70.8 grams of chloroacetic acid was used in almost one liter of sodium hydroxide solution. This is a ratio of 1.5 moles of chloroacetic acid per mole of melamine. The resulting resin sequestered 1.9 milli-equivalents of ferric ion per gram of resin.

Example 3

70.8 grams of chloroacetic acid was dissolved in about one liter of ten percent sodium hydroxide solution. The solution was kept between room temperature and 35° C while 63 grams of melamine was added. After stirring about 30 minutes at 35° C, about one-half liter of 10 percent sodium hydroxide solution containing 80 grams of formaldehyde was slowly added. The pH of the resultant solution was greater than 10. Heating at 35° C was continued for 15 minutes and the temperature then increased to boiling with a reflux condenser over the flask. After boiling for three hours the resin was filtered and washed with 0.1N sodium hydroxide and distilled water. The dry resin appeared to be softer than the resin in Example 1. About 1.9 milli-equivalents of ferric ion was sequestered per gram of resin.

Example 4

94.5 grams of chloroacetic acid was dissolved in about one liter of 10 percent by weight sodium hydroxide solution. This solution was kept at or a little below 35° C while 63 grams of melamine was dissolved therein. The solution was heated at 35° C for 30 minutes after the melamine was completely in solution. A second solution was made up at room temperature containing 192 grams of formaldehyde and 47 grams of phenol in about one liter of 10 percent by weight sodium hydroxide. This solution was permitted to stand at room temperature for about an hour before use, whereupon it was slowly added to the melamine bearing solution. The pH was in excess of 10 and the resultant solution was brought back to 35° C and held at that temperature for about 10 minutes. The solution was then gradually heated to boiling and maintained at a boil under reflux conditions for about 4 hours. The resulting resin sequestered 1.6 milli-equivalents of ferric ion per gram of dry resin.

Example 5

A resin was made by a technique substantially the same as that in Example 4, except that the molar ratio of melamine to phenol was 5:1 instead of 1:1 as in Example 4. The sequestering ability of the resultant resin was 1.7 milli-equivalents of ferric ion per gram of dry resin.

Example 6

A resin was made as in Example 2, except that instead of 6 moles of formaldehyde per mole of melamine, a molar ratio of 3.7:1 of formaldehyde to melamine was used. No significant difference in the properties of the resin was noted. However, it is thought that the polymerization reaction proceeded to the desired end point more quickly than in Example 2.

Example 7

A resin was made using ingredients in the proportions set forth in Example 1. The formaldehyde-bearing solution was added and heating was continued at 35° C for 10 minutes. The pressure was meanwhile increased to about 70 psi and then the temperature was increased to 135° C which was held for 30 minutes. The resulting polymer sequestered 1.4 milli-equivalents of ferric ion per gram of resin. No significant difference in properties was noted between this resin and that produced according to the technique of Example 1.

Example 8

Water containing 40 ppm. calcium, 25 ppm. magnesium and 15 ppm. iron (ferric) at a pH of about 8.5 was passed through a 40 mm. diameter column containing 40 grams of resin prepared according to Example 1. After 20 liters of this solution was passed, no significant iron, calcium or magnesium was detected in the effluent. Calcium and iron were found after 25 liters was passed. The column was recharged by passing one liter of 20 percent by weight sodium chloride solution with 5 ml. concentrated hydrochloric acid added. After rinsing with about 1 liter of distilled water, similar results were obtained when 20 and 25 liters of the same water solution was passed through.

Although limited examples of sequestering resins made according to principles of this invention have been described herein, many modifications and variations will be apparent to one skilled in the art. Such resins are useful in ion exchange beds for extracting polyvalent cations from water passed therethrough in a conventional manner. It is therefore to be understood that within the scope of the appended claims the invention may be practiced otherwise than as specifically described.

What is claimed is:

1. A substantially water insoluble cross-linked sequestering resin consisting essentially of the reaction product of melamine reacted with chloroacetic acid in strongly alkaline medium, and cross-linked with formaldehyde, employing from about 2.5 to 3.5 moles of formaldehyde per mole of original melamine, in strongly alkaline medium maintained at a pH of from 10 to 11, the number of effective sequestering groups exceeding one for every three amine nitrogens in the resin.

2. A resin as defined in claim 1 comprising the reaction product when the molar ratio of chloroacetic acid to melamine is in excess of about one to one.

3. A resin as defined in claim 2 comprising the reaction product when cross-linking with formaldehyde is also conducted in the presence of phenol or a phenol-formaldehyde prepolymer.

4. A process for making a substantially water-insoluble cross-linked sequestering resin of the amino carboxylic acid type where the number of effective sequestering groups exceed one for every three amine nitrogens in the resin consisting essentially of the steps of:
   reacting melamine with chloracetic acid in strongly alkaline aqueous solution; and
   cross-linking the product of the reacting step by contact with formaldehyde, employing from about 2.5 to 3.5 moles of formaldehyde per mole of original mole of melamine, in strongly alkaline solution maintained at a pH of from 10 to 11.

5. A method as defined in claim 4 wherein the mole ratio of chloroacetic acid to melamine is at least one to one.

6. A method as defined in claim 6 comprising the additional step of adding an extender selected from the group consisting of phenol and a phenol-formaldehyde prepolymer prior to the cross-linking step.

7. A method as defined in claim 6 wherein the mole ratio of extender to melamine is less than about 1:1.

8. A process for removing polyvalent cations from aqueous medium comprising the step of contacting the aqueous medium with a water-insoluble, cross-linked sequestering resin consisting essentially of the reaction product of melamine and chloroacetic acid in strong alkaline solution followed by cross-linking with formaldehyde, employing from about 2.5 to 3.5 moles of formaldehyde per mole of original melamine, in strongly alkaline solution, maintained at a pH of from 10 to 11, the number of effective sequestering groups exceeding one for every three amine nitrogens in the resin.

* * * * *

UNITED STATES PATENT OFFICE
CERTIFICATE OF CORRECTION

Patent No. 3,816,356          Dated   June 11, 1974

Inventor(s) Edward A. Grannen, Leon Robinson

It is certified that error appears in the above-identified patent and that said Letters Patent are hereby corrected as shown below:

Column 1, line 37, "comprising" should be deleted.

Column 3, line 35, should be as follows:

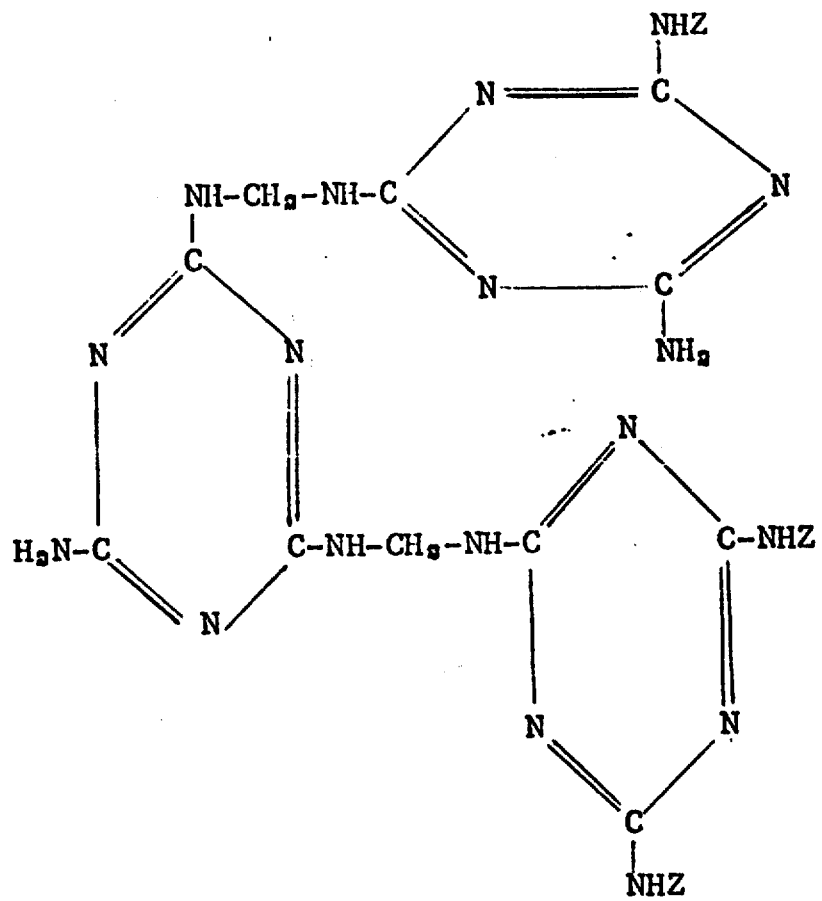

UNITED STATES PATENT OFFICE
CERTIFICATE OF CORRECTION

Patent No. 3,816,356         Dated June 11, 1974

Inventor(s) Edward A. Grannen, Leon Robinson

It is certified that error appears in the above-identified patent and that said Letters Patent are hereby corrected as shown below:

Column 4, line 30, should be:

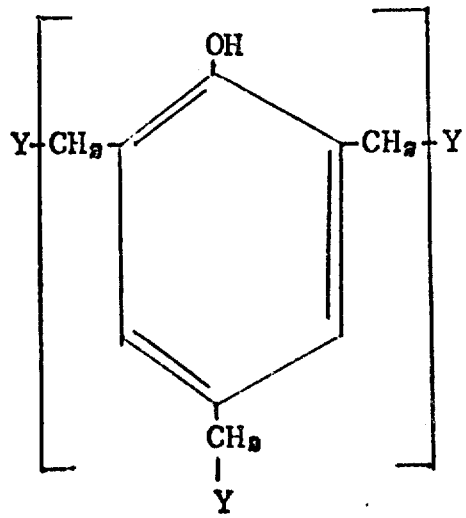

Column 6, line 67, "claim 6" should be -- claim 4 --.

Signed and sealed this 17th day of June 1975.

(SEAL)
Attest:

RUTH C. MASON
Attesting Officer

C. MARSHALL DANN
Commissioner of Patents
and Trademarks